March 6, 1951 C. A. JOHNSON, JR., ET AL 2,544,325

TELEPHONE SUBSTATION APPARATUS

Filed July 30, 1947 4 Sheets-Sheet 1

INVENTORS C. A. JOHNSON, JR.
C. L. KRUMREICH
BY

ATTORNEY

March 6, 1951 C. A. JOHNSON, JR., ET AL 2,544,325

TELEPHONE SUBSTATION APPARATUS

Filed July 30, 1947 4 Sheets-Sheet 2

INVENTORS C. A. JOHNSON, JR.
C. L. KRUMREICH
BY
ATTORNEY

March 6, 1951 C. A. JOHNSON, JR., ET AL 2,544,325

TELEPHONE SUBSTATION APPARATUS

Filed July 30, 1947 4 Sheets-Sheet 3

INVENTORS C. A. JOHNSON, JR.
C. L. KRUMREICH
BY [signature]
ATTORNEY

March 6, 1951 C. A. JOHNSON, JR., ET AL 2,544,325

TELEPHONE SUBSTATION APPARATUS

Filed July 30, 1947 4 Sheets-Sheet 4

INVENTORS C. A. JOHNSON, JR.
C. L. KRUMREICH

BY R. J. Guenther

ATTORNEY

Patented Mar. 6, 1951 2,544,325

UNITED STATES PATENT OFFICE 2,544,325

TELEPHONE SUBSTATION APPARATUS

Charles A. Johnson, Jr., Murray Hill, and Charles L. Krumreich, Paterson, N. J., assignors to Bell Telephone Laboratories, Incorporated, New York, N. Y., a corporation of New York Application July 30, 1947, Serial No. 764,614

1 Claim. (Cl. 179—100)

This invention relates to telephone substation apparatus and more particularly to mountings for hand telephones.

One type of hand telephone mounting comprises a casing or housing having a portion or cradle for receiving a hand telephone, contact springs actuated in accordance with the placement of the hand telephone in or removal thereof from the cradle, and substation instrumentalities, such as a condenser, filter, induction coil and other circuit elements, mounted within the housing. These instrumentalities have been interconnected heretofore by a multiplicity of wires connected to the instrumentalities and to terminal blocks, as by way of mechanical fasteners such as terminal screws.

In such constructions, the possibilities of open circuits or poor electrical connections are manifold. Also the establishment of proper interconnection of the components requires a large number of individual operations, as well as substantial skill on the part of the assembler, and, therefore, the manufacture of telephone sets of these constructions is time consuming and relatively expensive. Additionally, in such sets including a dial, replacement of the dial in the event of failure thereof or removal of the dial to convert a set for use in manual systems involves a series of operations and entails substantial expense.

One object of this invention is to facilitate the manufacture of telephone substation apparatus.

Another object of this invention is to expedite and simplify the interconnection of the substation instrumentalities in telephone mountings.

A further object of this invention is to facilitate the mounting and replacement of the dial in telephone mountings.

Still another object of this invention is to improve the electrical interconnection of substation instrumentalities in telephone sets.

A still further object of this invention is to reduce the number of mechanical fasteners, such as screw type terminals, requisite for the electrical association of the components of a telephone subset.

In accordance with one feature of this invention, in a hand telephone mounting of the type heretofore described, certain of the substation instrumentalities are electrically interconnected by bus bars positioned in prescribed relation within the casing and housing, and terminals on the instrumentalities the terminals and bus bars being provided with cooperating portions which are placed in immediate proximity for proper connection when the instrumentalities are positioned in the assembly of the set.

More specifically, in accordance with one feature of this invention, in a telephone set, there is provided an insulating mounting plate having therein a plurality of apertures extending from one face thereof to a recess in the other face, and having also therein grooves or channels in the one face thereof, extending between the apertures in accordance with a prescribed circuit design. Positioned in the grooves or channels are electrical conductors or bus bars having end portions projecting through the apertures and into the recess aforenoted. The substation instrumentalities are provided with terminals, e. g. terminal prongs, adapted to extend through respective ones of the apertures and into the recess. Thus, when the instrumentalities and bus bars are positioned on the mounting plate, each terminal is in immediate proximity to an end portion of a bus bar. The terminals and respective bus bar ends may be fixedly connected electrically, as by a mass soldering operation, whereby positive electrical connection of the substation circuit components is expedited and assured.

Advantageously, the terminals and bus bar ends are located in a restricted area whereby the connection thereof may be effected readily and economically as by a dip or automatic soldering operation.

In accordance with another feature of this invention, a jack, appropriately connected electrically to the other substation circuit components and certain of the bus bars, is mounted upon the mounting plate and the dial is provided with extending terminals or prongs arranged to fit into the jack thereby to properly connect the dial in the substation circuit when the terminals are inserted into the jack. The dial also is supported from the mounting plate and, thus, may be replaced readily, as for repair or in the case of conversion of the telephone set for use in manual systems.

In accordance with a further feature of the invention, the contact springs constitute a part of a unitary assembly supported on the mounting plate and having terminals cooperatively associated with the proper bus bars, the assembly including also a spring operating member positioned to be operatively engaged by an actuating member, such as a plunger extending from the hand telephone receiving cradle in the housing of a desk or wall set.

The invention and the above-noted and other features thereof will be understood more clearly and fully from the following detailed description with reference to the accompanying drawing, in which.

Figure 1:
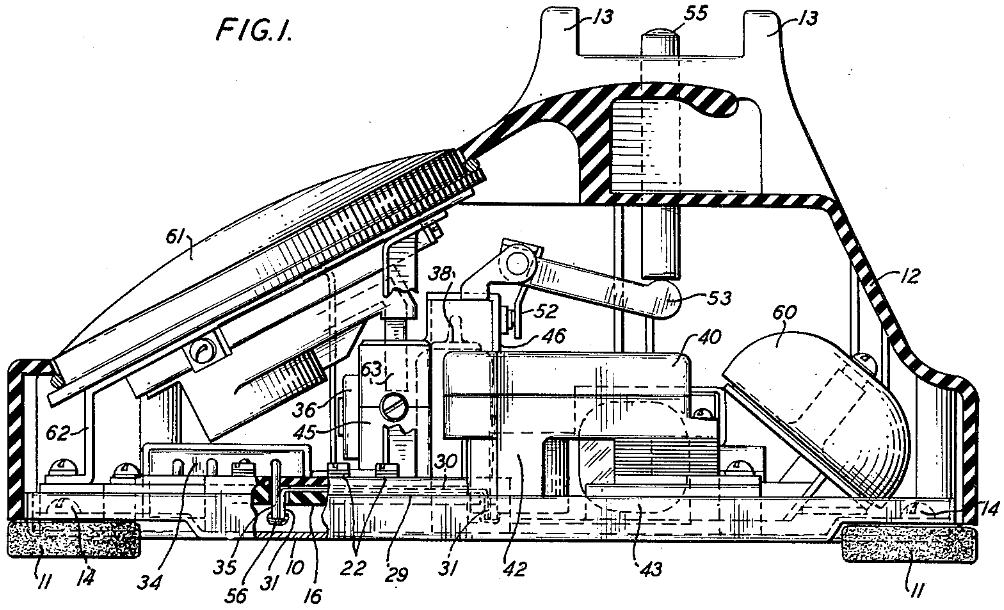
Fig. 1 is a side elevational view mainly in section of a telephone desk set illustrative of one embodiment of this invention.

Referring now to the drawing, the telephone desk set therein illustrated comprises a housing of the general construction disclosed in Patent 2,096,046 granted October 19, 1937 to George R. Lum and John J. Kuhn and including a base 10, for example a metal plate, having supporting feet or pads 11 fastened thereon by screws 14, and a hollow casing 12. The casing has thereon two pairs of tines 13, only one pair of which is shown in Fig. 1, defining portions of a cradle for receiving a hand telephone, not shown.

Figure 3:
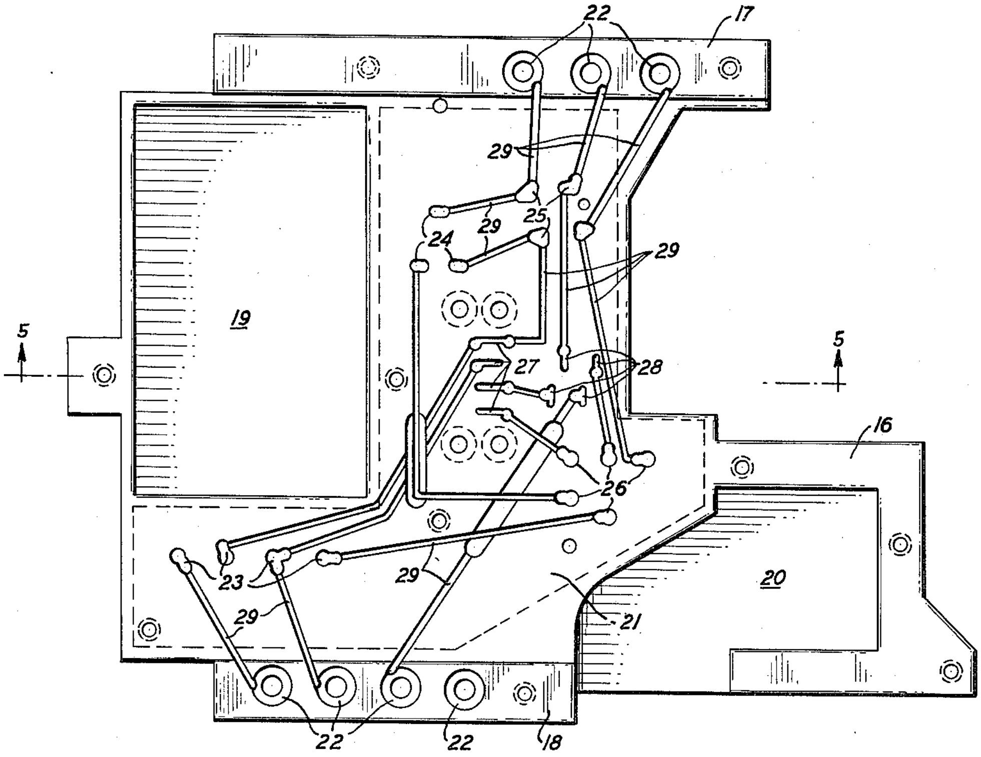
Fig. 3 is a plan view of the terminal and mounting block included in the desk set.
Figure 4:
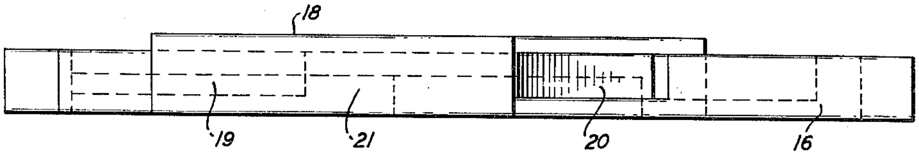
Fig. 4 is a side view of the block.
Figure 5:
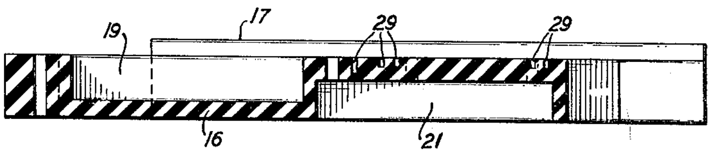
Fig. 5 is a view in section taken along plane 5—5 of Fig. 3.

Affixed to the base plate 10, as by screws 15 threaded thereinto, is an insulating block or plate 16, for example of hard rubber, having raised side portions 17 and 18 and having also recesses 19 and 20 in one face thereof and a recess 21 in the other face thereof. Both the side portions 17 and 18 are provided with countersunk bores having fitted therein metal eyelets 22, seen most clearly in Fig. 3, for receiving terminal screws to be described hereinafter. The block or plate 16 is provided also with a plurality of groups or bores 23, 24, 25 and 26 and two groups of slots 27 and 28 which extend therethrough and communicate with the recess 21. These bores and slots and also the bores having the eyelets 22 therein are interconnected, in the manner illustrated most clearly in Fig. 3, by channels or grooves 29 in one face of the block or plate 16. Seated in the grooves 29 are bus bars each of which has an intermediate portion 30 fitted in the respective groove or channel, and end portions 31 which extend into the apertures or slots at the ends of the respective channel or groove and all of which, with the exception of those at the eyelets 22, project into the recess 21.

Figure 6:
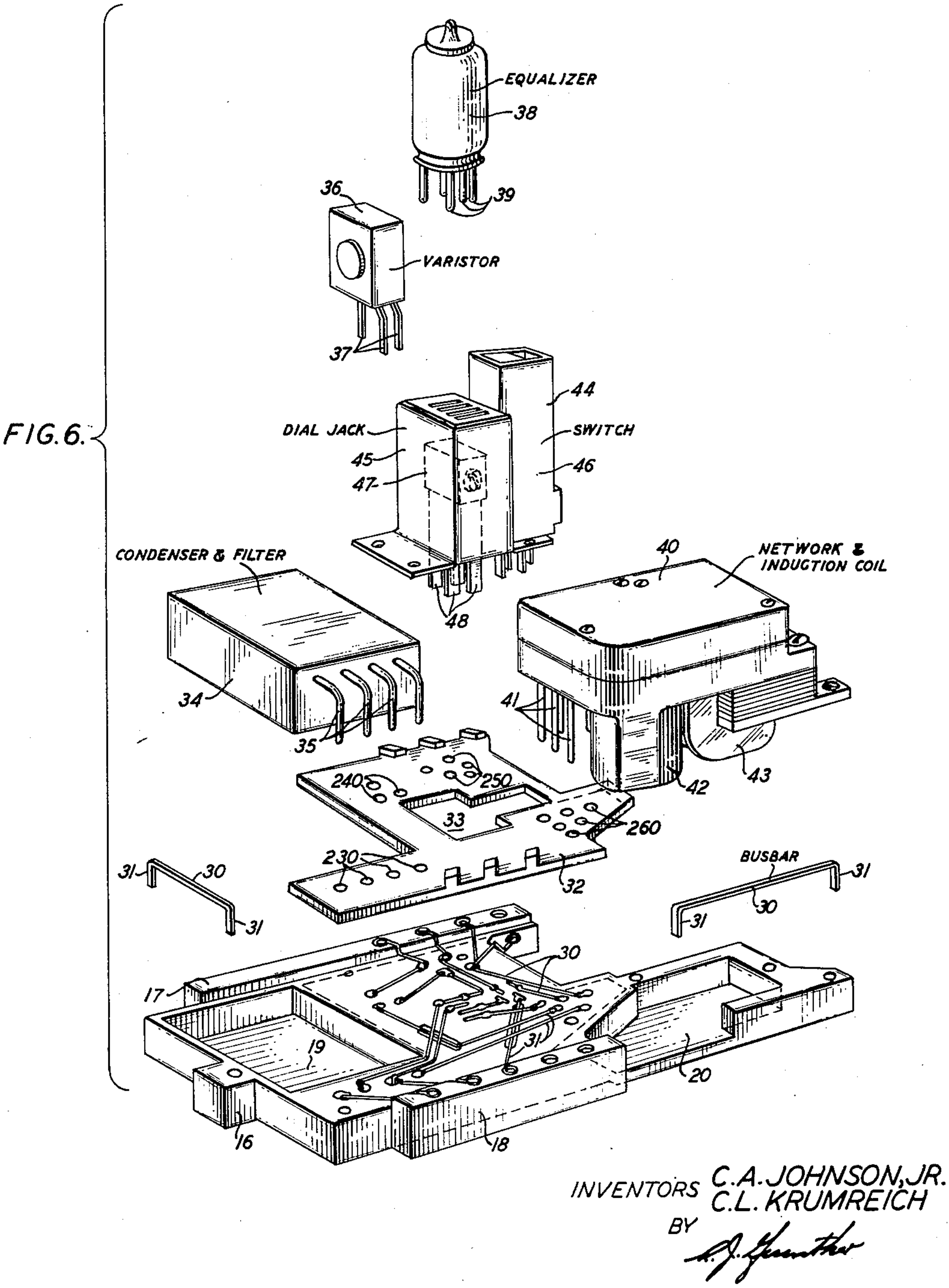
Fig. 6 is an exploded perspective view of the terminal and mounting block and the substation instrumentalities mounted thereby.

As illustrated in Fig. 6, the bus bars may be formed of flat stock provided with bent ends or may be stamped members the intermediate portions of which are seated edgewise in the grooves. Alternatively, the bus bars may be formed of round, square or other shaped wires.

Overlying the grooves and bus bars and affixed to the plate or block 16 is a cover plate 32 having an opening 33 therein opposite the slots 27 and 28 and having also groups of apertures 230, 240, 250 and 260, each aperture being aligned with a corresponding aperture in the block 16.

Supported upon the plate or block 16 are all of the instrumentalities requisite for the substation circuit. Specifically, the instrumentalities include a condenser and filter unit 34 provided with terminal prongs 35 located to fit into the apertures or bores 23 and 230, a varistor unit 36, such as a disc-type copper-oxide rectifier, having terminal prongs 37 arranged to pass into the apertures or bores 24 and 240, an equalizer 38 such as a ballast lamp and resistor having terminal prongs 39 arranged to enter the apertures or bores 25 and 250 and a balancing network and induction coil unit 40 having terminal prongs 41 arranged to enter the apertures or bores 26 and 260, the unit 40 including a positioning stud 42 and the coil 43 thereof being seated in the recess 20. All of the terminal prongs are of sufficient length to project through the plate or block 16 and into the recess 21.

Figure 8:
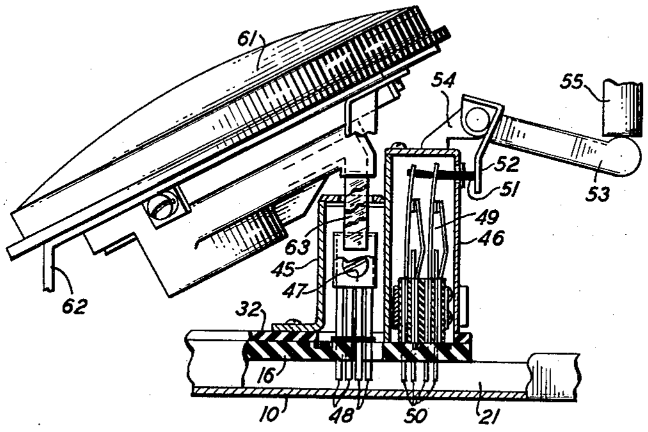
Fig. 8 is a detail view, partly in section, of the dial, the plug and jack therefor and the contact springs and associated operating mechanism included in the desk set.

Also mounted upon the cover plate 32 is a unitary jack and contact spring or switch assembly 44 which, as shown clearly in Fig. 8, comprises a two-part housing 45, 46, the part 45 having therein a jack 47 from which strip terminals 48 arranged to enter the slots 27 extend. The housing part 46 encloses a contact spring assembly 49 from which strip terminals 50 arranged to pass into the slots 28 extend. One of the contact springs engages a pin or stud 51 extending slidably through an aperture in the housing part 46 and engaged by a finger 52 extending from a rocker member 53. The latter is mounted pivotally upon a bracket 54 affixed to the housing 45, 46 and, as shown most clearly in Figs. 2 and 8, comprises two arms each of which is engaged adjacent its free end by a respective reciprocable plunger 55 extending between the tines 13.

As shown clearly in Fig. 8, the terminals 48 and 50 are of sufficient length to project into the recess 21.

Figure 9:
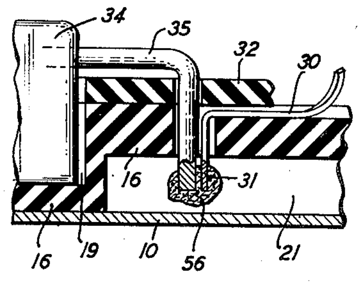
Fig. 9 is a fragmentary view, mainly in section, illustrating the terminal connections for the condenser and filter assembly included in the desk set.

It will be noted that when the several substation instrumentalities are mounted upon the block 16 with the various terminals extending through the apertures or slots in this block, each terminal is adjacent and parallel to a respective end portion 31 of one of the bus bars. All of the terminals project into the recess 21. Electrical connection between each terminal and the associated end portion 31 of a bus bar is established by soldering as illustrated at 56 in Fig. 9. All of the connections may be made simultaneously as by dipping the terminals and adjacent bus bar end portions into a mass of solder carried in a vessel of appropriate form to fit within the recess 21. Thus, the several instrumentalities are firmly mounted in position and together with the plate or block 16 and cover plate 32 constitute a unitary assembly wherein the substation elements are electrically associated in a prescribed manner. The exact electrical interconnection of the parts may be varied, of course, by appropriate disposition of the grooves 29 and bus bars 30, 31 to fit any desired substation circuit.

Figure 2:
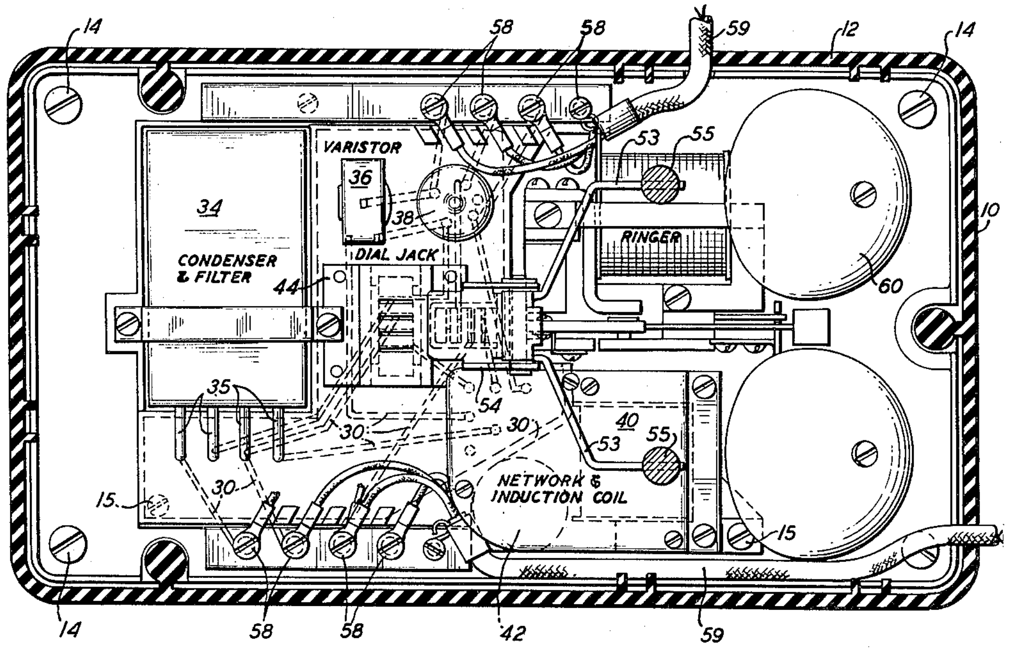
Fig. 2 is a plan view of the desk set with the housing broken away and the dial removed.
Figure 7:
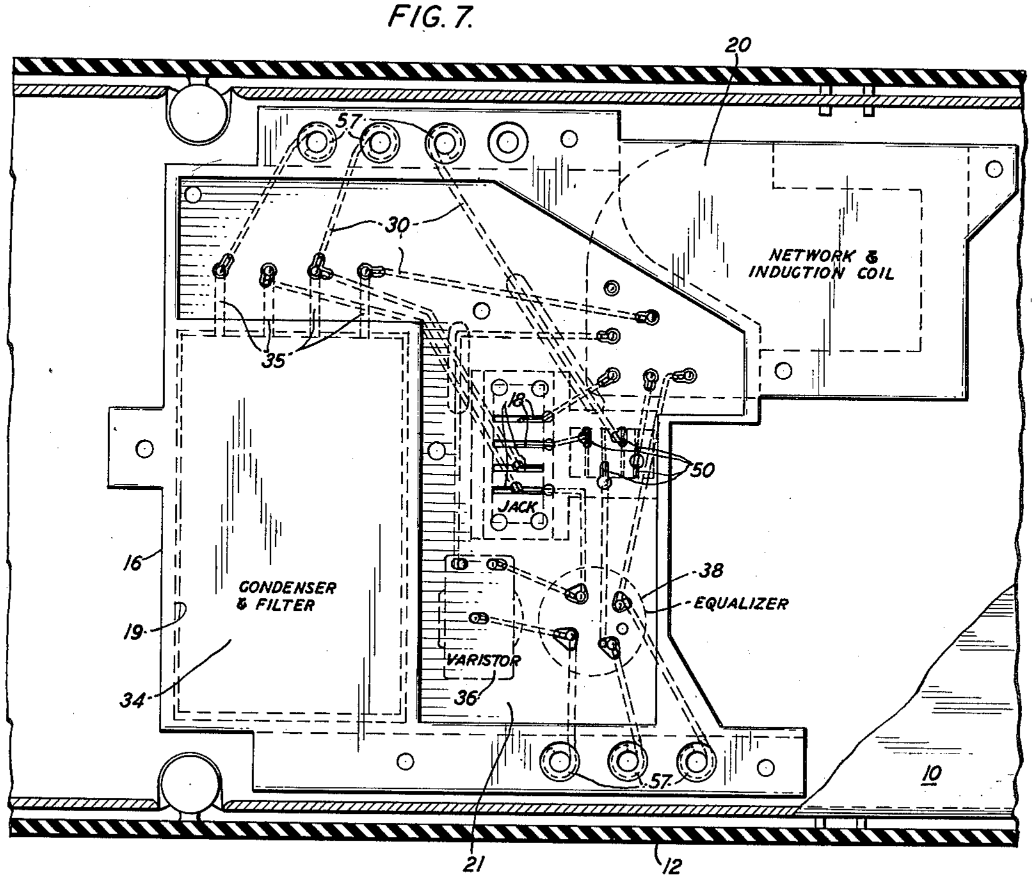
Fig. 7 is a partial bottom view of the desk set.

Certain of the bus bars may be provided, as illustrated in Figs. 2 and 7, with looped end portions 57 for receiving terminal screws 58 threaded into the eyelets 22. Multiconductor cords and cables 59 are connected to the terminals by way of the screws 58 and serve to associate a hand telephone with the substation circuit and connect the latter to the telephone line or usual junction box.

A ringer 60 is provided within the housing 10, 12, mounted upon the base 10 or block 16 and connected to proper cord terminals by way of conductors, not shown.

Also provided is a dial 61 which is supported from the block 16 by a bracket 62 and has thereon strip terminals 63 arranged to fit the jack 47 within the housing part 45.

Although a specific embodiment of the invention has been shown and described, it will be understood that it is but illustrative and that various modifications may be made therein without departing from the scope and spirit of this invention as defined in the appended claim.

What is claimed is:

A telephone set comprising a housing having a base, a wall, and having also a cradle portion for receiving a hand telephone, a mounting plate seated upon said base and having therein a plurality of channels in one face thereof and a recess in the other face thereof, said wall having an aperture therein opposite said plate, said plate having also therein a plurality of apertures extending from said channels into said recess, substation circuit instrumentalities mounted on the one face of said plate, terminals extending from each of said instrumentalities into preassigned ones of said apertures, a contact spring assembly mounted on said plate and including terminals extending into prescribed ones of said apertures, means for interconnecting said contact springs and instrumentalities to constitute a substation circuit, said means comprising bus bars in said channels and having portions extending into said apertures, each of said portions being connected to the respective terminal, an actuating member for the contact springs supported from said plate, reciprocable plunger means extending into said housing from said cradle and engaging said actuating member, a jack having terminals extending into certain of said apertures, bus bar means connecting said jack terminals to said circuit, a dial supported from said plate and extending into said aperture in said wall, and terminals extending from said dial and mating with said jack.

CHARLES A. JOHNSON, Jr.
CHARLES L. KRUMREICH.

REFERENCES CITED

The following references are of record in the file of this patent:

UNITED STATES PATENTS

| Number | Name | Date |
|---|---|---|
| 2,066,876 | Carpenter | Jan. 5, 1937 |
| 2,226,734 | McLarn | Dec. 31, 1940 |
| 2,244,009 | Hiensch | June 3, 1941 |
| 2,268,619 | Reid | Jan. 6, 1942 |
| 2,279,713 | McLarn | Apr. 14, 1942 |
| 2,333,299 | Deakin | Nov. 2, 1943 |